US011562010B2

(12) United States Patent
Miao et al.

(10) Patent No.: US 11,562,010 B2
(45) Date of Patent: Jan. 24, 2023

(54) METHOD AND APPARATUS FOR OUTPUTTING INFORMATION

(71) Applicant: Baidu Online Network Technology (Beijing) Co., Ltd., Beijing (CN)

(72) Inventors: Yafei Miao, Beijing (CN); Wensong He, Beijing (CN); Ben Xu, Beijing (CN); Jian Xie, Beijing (CN); Yipin Zhang, Beijing (CN); Yan Wang, Beijing (CN); Yongyi Liu, Beijing (CN); Chu Wang, Beijing (CN)

(73) Assignees: Baidu Online Network Technology (Beijing) Co., Ltd., Beijing (CN); Shanghai Xiaodu Technology Co. Ltd., Shanghai (CN)

( * ) Notice: Subject to any disclaimer, the term of this patent is extended or adjusted under 35 U.S.C. 154(b) by 125 days.

(21) Appl. No.: 17/024,654

(22) Filed: Sep. 17, 2020

(65) Prior Publication Data

US 2021/0248171 A1 Aug. 12, 2021

(30) Foreign Application Priority Data

Feb. 12, 2020 (CN) ......................... 202010088113.7

(51) Int. Cl.

| | |
|---|---|
| ***G06F 16/33*** | (2019.01) |
| ***G06F 16/338*** | (2019.01) |
| ***G06F 40/295*** | (2020.01) |
| ***G06N 5/02*** | (2006.01) |
| ***G06N 5/04*** | (2006.01) |

(52) U.S. Cl.

CPC ........ *G06F 16/3344* (2019.01); *G06F 16/338* (2019.01); *G06F 40/295* (2020.01); *G06N 5/02* (2013.01); *G06N 5/04* (2013.01)

(58) Field of Classification Search

CPC .. G06F 16/3344; G06F 16/338; G06F 40/295; G06N 5/02; G06N 5/04

USPC .......................................................... 707/722

See application file for complete search history.

(56) References Cited

U.S. PATENT DOCUMENTS

| | | | | |
|---|---|---|---|---|
| 9,865,260 | B1 * | 1/2018 | Vuskovic | G10L 15/222 |
| 10,437,833 | B1 * | 10/2019 | Nguyen | G06F 40/284 |
| 10,978,056 | B1 * | 4/2021 | Challa | G06F 16/3344 |
| 2014/0025705 | A1 | 1/2014 | Barve | |

(Continued)

FOREIGN PATENT DOCUMENTS

| | | |
|---|---|---|
| JP | 2017-076403 A | 4/2017 |
| JP | 2018-113064 A | 7/2018 |

(Continued)

*Primary Examiner* — Evan Aspinwall

(74) *Attorney, Agent, or Firm* — Nixon Peabody LLP

(57) ABSTRACT

Embodiments of the present disclosure provide a method and apparatus for outputting information. A specific embodiment of the method includes: in response to receiving a query, detecting whether there is an entity slot in the query; in response to there being an entity slot in the query, adding the detected entity slot to a candidate slot; detecting, in the query, a relationship-determinative word of an entity; searching in a preset knowledge graph for a peripheral knowledge graph of the candidate slot; and inferring on the basis of the peripheral knowledge graph according to the relationship-determinative word, and outputting an entity word matching the relationship-determinative word.

15 Claims, 4 Drawing Sheets

200

(56) References Cited

U.S. PATENT DOCUMENTS

| | | | | |
|---|---|---|---|---|
| 2014/0025706 | A1 | 1/2014 | Barve | |
| 2014/0058724 | A1 | 2/2014 | Barve | |
| 2014/0163965 | A1 | 6/2014 | Barve | |
| 2016/0342702 | A1 | 11/2016 | Barve | |
| 2017/0109355 | A1 | 4/2017 | Li | |
| 2018/0232443 | A1* | 8/2018 | Delgo | G06F 40/295 |
| 2019/0311275 | A1 | 10/2019 | Huang | |
| 2020/0152190 | A1* | 5/2020 | Itkowitz | A61B 34/76 |
| 2020/0311167 | A1 | 10/2020 | Barve | |

FOREIGN PATENT DOCUMENTS

| | | | |
|---|---|---|---|
| JP | 2019-074843 | A | 5/2019 |
| JP | 2019-185716 | A | 10/2019 |

* cited by examiner

METHOD AND APPARATUS FOR OUTPUTTING INFORMATION

CROSS-REFERENCE TO RELATED APPLICATIONS

This application claims priority to Chinese Patent Application No. 202010088113.7, filed with the China National Intellectual Property Administration (CNIPA) on Feb. 12, 2020, the contents of which are incorporated herein by reference in their entirety.

TECHNICAL FIELD

Embodiments of the present disclosure relate to the field of computer technology, and more particularly, to a method and apparatus for outputting information.

BACKGROUND

Slot recognition is one of the basic tasks in the natural language processing task, i.e., marking a desired word or phrase from a natural language sentence. For example, "I wanna listen to the song me and my country sung by Wang F," where the "Wang F" is recognized as a singer, and "me and my country" is recognized as a name of a song.

In the field of man-machine sessions, the expression of a user is usually not so canonical, in particular in session scenes related to the preceding and following context, the user may omit some words or substitute some of the previously presented word segments with a relationship-determinative word, for example:

Example 1

Human: I wanna listen to the song me and my country sung by Wang F.

Robot: the song me and my country sung by Wang F is found for you, please enjoy.

Human: I wanna watch her movie (slot1: her, slot2: movie).

Example 2

Human: I wanna listen to the song me and my country sung by Wang F.

Robot: the song me and my country sung by Wang F is found for you, please enjoy.

Human: change to another version to listen (slot1: change to another version).

For conventional sequence labeling, only the demonstrative pronoun "her", the resource "movie," and the behavior "change to another version" are labeled, while a richer meaning cannot be recognized. For the backend vertical search service, simple resource search is not allowed for theses slots.

The existing multi-rounds slot recognition strategy basically includes the following two types of solutions:

1. The slot sequence labeling is directly performed without anaphora resolution and semantic extension, and the application party understands the real requirements of the user through code logic or rules. When using these slots, the application party retrieves resources by writing very complex combinational logic or rigid manual rules.

2. During slot recognition, a session state machine is maintained to record all sessions of the human-computer interaction, to replace the demonstrative pronoun with the slot recognized in a preceding round session.

The problems of multi-rounds slot recognition of the prior art are mainly inadequacies in universality, robustness, maintainability, expandability, and the like, as follows:

The idea of solution (1) is direct, and words with a reference relationship are directly outputted, and the responsibility for understanding is given to the application party (usually a vertical service) applying the analysis result of the natural language understanding, which undoubtedly greatly increases the development difficulty for the application side. With the system device of this solution, the slot naming interface between sub-modules can be very complex and low maintainability.

In solution (2), certain anaphora resolution are performed on the demonstrative pronoun, so that complexity of slot naming is simplified, and some of the noun slots can be replaced, but the ability to resolve the behavior verb or the descriptive and restrictive word is limited. This problem can only be solved by writing different state machines for different vertical classes, which undoubtedly increases complexity and development costs.

SUMMARY

Embodiments of the present disclosure provide a method and apparatus for outputting information.

According to a first aspect, some embodiments of the present disclose provides a method for outputting information, including: in response to receiving a query, detecting whether there is an entity slot in the query; in response to there being an entity slot in the query, adding the detected entity slot to a candidate slot; detecting, in the query, a relationship-determinative word of an entity; searching in a preset knowledge graph for a peripheral knowledge graph of the candidate slot; inferring on the basis of the peripheral knowledge graph according to the relationship-determinative word, and outputting an entity word matching the relationship-determinative word.

In some embodiments, the method further includes: in response to there being not an entity slot in the query, determining from a historical session an entity slot to add to the candidate slot.

In some embodiments, the method further includes: detecting whether there is a demonstrative pronoun in the candidate slot; in response to there being a demonstrative pronoun in the candidate slot, replacing the demonstrative pronoun with an entity word presenting in the most recent session.

In some embodiments, the replacing the demonstrative pronoun with the entity word presenting in the most recent session includes: in response to a number of entity words presenting in the most recent session exceeding one, finding, according to semantics, an entity word for replacing the demonstrative pronoun, and performing the replacing.

In some embodiments, the method further includes: inferring, on the basis of the peripheral knowledge graph, according to the entity word presenting the most recent session and the relationship-determinative word, and outputting an entity word matching the entity word presenting the most recent session and the relationship-determinative word.

According to a second aspect, some embodiments of the present disclosure provide an apparatus for outputting information, the apparatus includes: an entity detection unit, configured to, in response to receiving a query, detect whether there is an entity slot in the query; an adding unit, configured to, in response to there being an entity slot in the query, add the detected entity slot to a candidate slot; a relationship detection unit, configured to detect, in the query, a relationship-determinative word of an entity; a search unit, configured to search in a preset knowledge graph for a peripheral knowledge graph of the candidate slot; and an inference unit, configured to infer on the basis of the peripheral knowledge graph according to the relationship-determinative word, and outputting an entity word matching the relationship-determinative word.

In some embodiments, the adding unit is further configured to: in response to there being not an entity slot in the query, determine from a historical session an entity slot to add to the candidate slot.

In some embodiments, the apparatus further comprises a demonstrative pronoun detection unit configured to: detect whether there is a demonstrative pronoun in the candidate slot; and in response to there being a demonstrative pronoun in the candidate slot, replace the demonstrative pronoun with an entity word presenting in the most recent session.

In some embodiments, the demonstrative pronoun detection unit is further configured to: in response to a number of entity words presenting in the most recent session exceeding one, find, according to semantics, an entity word for replacing the demonstrative pronoun, and perform the replacing.

In some embodiments, the demonstrative pronoun detection unit is further configured to: infer, on the basis of the peripheral knowledge graph, according to the entity word presenting in the most recent session and the relationship-determinative word, and outputting an entity word matching the entity word presenting the most recent session and the relationship-determinative word.

According to a third aspect, some embodiments of the present disclosure provides an electronic device for outputting information, the electronic device includes: one or more processors; storage means on which one or more programs are stored, when the one or more programs are executed by the one or more processors, causing the one or more processors to implement any one of the method according to the first aspect.

According to a fourth aspect, some embodiments of the present disclosure provide a computer readable medium having a computer program stored thereon, where the program, when executed by a processor, causes the processor to perform any one of the method according to the first aspect.

The method and apparatus for outputting information provided by embodiments of the present disclosure, introduces the logic derivation ability that is based on the knowledge graph into the multi-round man-machine session, and does not distinguish the intention of the user query. The method is global universal and mechanism flexible, and can significantly reduce the number of interaction rounds and time consumption between the user and the session robot while improving the ability of slot recognition.

BRIEF DESCRIPTION OF THE DRAWINGS

Other features, objectives, and advantages of the present disclosure will become more apparent by reading the detailed description of non-limiting embodiments made with reference to the following figures.

DETAILED DESCRIPTION OF EMBODIMENTS

Embodiments of present disclosure will be described below in detail with reference to the accompanying drawings.

It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
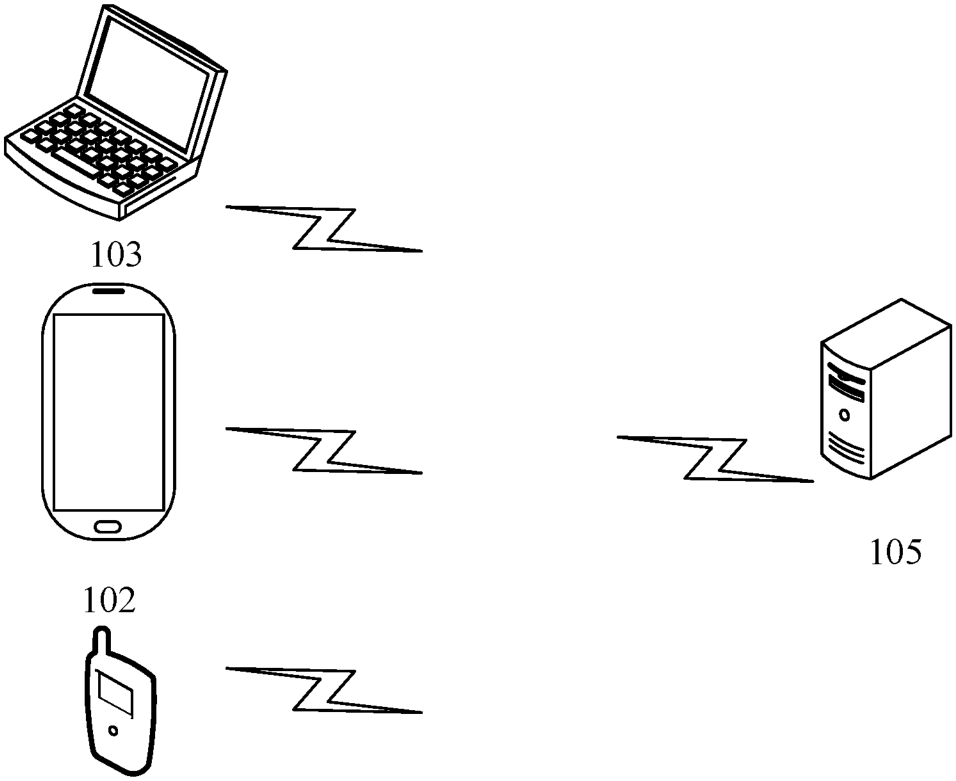
FIG. 1 is an example system architecture diagram in which an embodiment of the present disclosure may be applied.

FIG. 1 illustrates an example system architecture 100 in which a method for outputting information or an apparatus for outputting information according to an embodiment of the present disclosure may be applied.

As shown in FIG. 1, the system architecture 100 may include terminal devices 101, 102, 103, a network 104, and a server 105. The network 104 serves as a medium for providing a communication link between the terminal devices 101, 102, 103 and the server 105. Network 104 may include various types of connections, such as wired, wireless communication links, or fiber optic cables, among others.

The user may interact with the server 105 through the network 104 by using the terminal devices 101, 102, 103 to receive or send messages, etc. The terminal devices 101, 102, 103 may have various communication client applications installed thereon, such as a man-machine interaction application, a web browser application, a shopping application, a search application, an instant messaging tool, a mailbox client, social platform software, and the like.

The terminal devices 101, 102, 103 may be hardware or software. When the terminal devices 101, 102, 103 are hardware, the terminal devices 101, 102, 103 may be various electronic devices having a microphone and a speaker and supporting a man-machine conversation, including but not limited to a smartphone, a tablet computer, an electronic book reader, an MP3 player (Moving Picture Experts Group Audio Layer III), a MP4 (Moving Picture Experts Group Audio Layer IV) player, a laptop portable computer, a desktop computer, and the like. When the terminal devices 101, 102, and 103 are software, they may be installed in the electronic devices listed above. It may be implemented as a plurality of software or software modules (e.g., for providing distributed services) or as a single software or software module. It is not specifically limited herein.

The server 105 may be a server providing various services, such as a man-machine session server providing answers to queries raised on the terminal devices 101, 102, 103. The man-machine session server may analyze the received data such as the man-machine session request, and feed back the processing result (e.g., answer) to the terminal device.

It should be noted that the server may be hardware or software. When the server is hardware, it may be implemented as a distributed server cluster composed of multiple servers, or may be implemented as a single server. When the server is software, it may be implemented as a plurality of software or software modules (e.g., a plurality of software or software modules for providing distributed services), or it may be implemented as a single software or software module. It is not specifically limited herein.

It should be noted that the method for outputting information provided in embodiments of the present disclosure is generally performed by the server 105, and accordingly, the apparatus for outputting information is generally provided in the server 105.

It should be understood that the number of terminal devices, networks and servers in FIG. 1 is merely illustrative. There may be any number of terminal devices, networks, and servers as desired for implementation.

Figure 2:
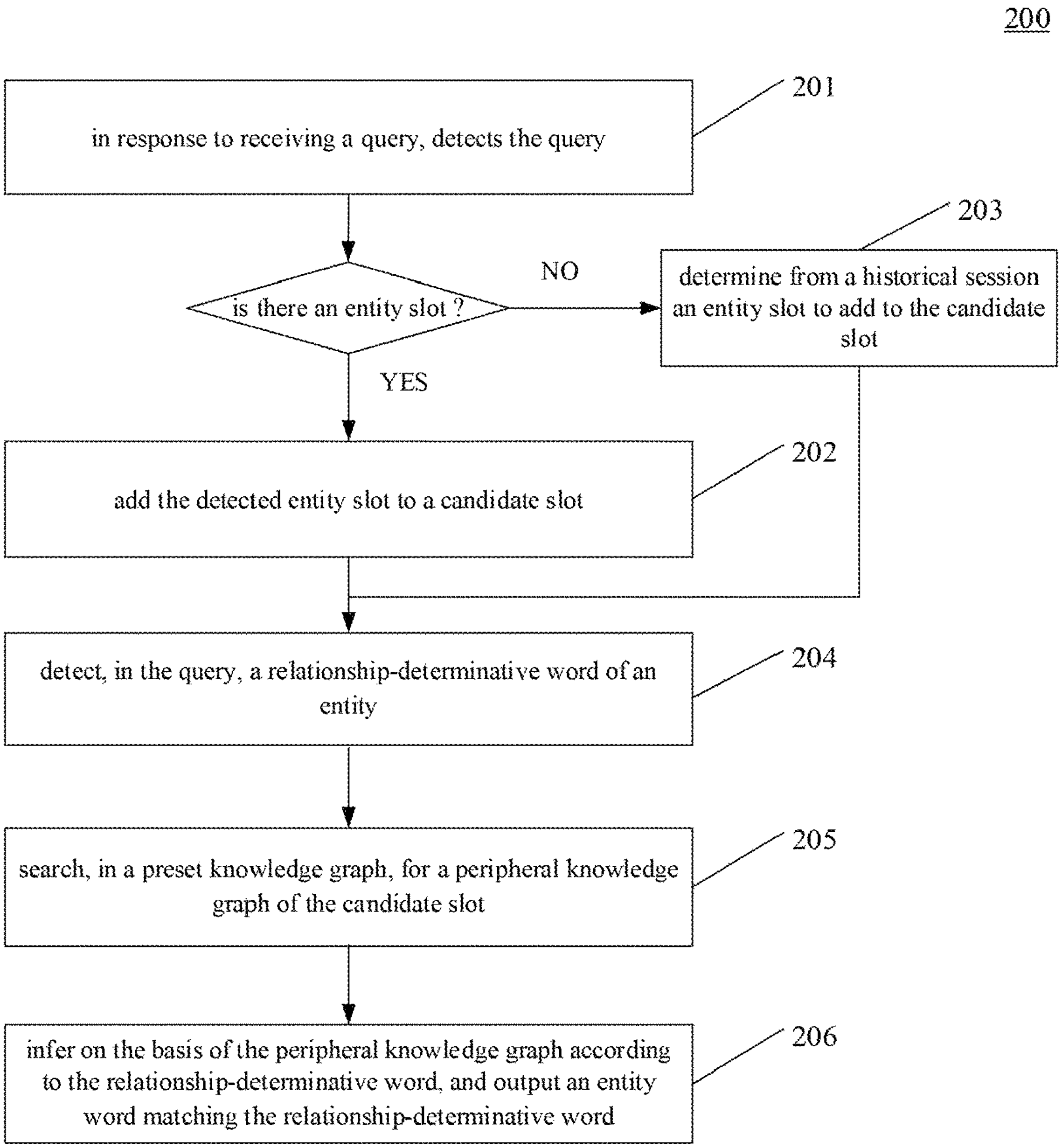
FIG. 2 is a flowchart of a method for outputting information according to an embodiment of the present disclosure.

With further reference to FIG. 2, a flow 200 of a method for outputting information according to an embodiment of present disclosure is shown. The method for outputting information includes:

Step 201, in response to receiving a query, detects the query.

In the present embodiment, an executing body of the method for outputting information, such as a server shown in FIG. 1, may receive a query input by a user. It may be a query in the form of speech or a query in the form of text. If it is a query in the form of speech, it needs to be converted into a query in the form of text. Then whether there is an entity slot in the query is detected. The entity slot may be a name of a person or an object, behavioral actions, song names, etc. The detecting the query refers to recognizing a slot. A variety of hybrid slot recognition methods may be employed, including, but not limited to, grammatical models, nn-crf models, artificial rules, and the like.

In step 202, in response to there being an entity slot in the query, add the detected entity slot to a candidate slot.

In the present embodiment, if an entity slot is directly detected in the current query, the detected entity slot is added to the candidate slot for subsequent processing. For example, in the man-machine session, a query is received, Human: I wanna listen to the song me and my country sung by Wang F. Entity slots “singer: Wang F” and “song: me and my country” may be detected.

In step 203, in response to there being not an entity slot in the query, determine from a historical session an entity slot to add to the candidate slot.

In this embodiment, if there is not an entity slot, at most five rounds of historical sessions can be traced back to find out whether there is an entity slot. If an entity slot is found, the found entity slot is added to a candidate slot; If not found, the current recognition result is returned directly according to a normal scheme.

In step 204, detect, in the query, a relationship-determinative word of an entity.

In the present embodiment, the relationship-determinative word may include a word defining the relationship between a person and an object, between a person and another person, or between an object and another object, such as “played by”, “sung by”, “endorsed by”, “wife”;

In step 205, search, in a preset knowledge graph, for a peripheral knowledge graph of the candidate slot.

Figure 3:
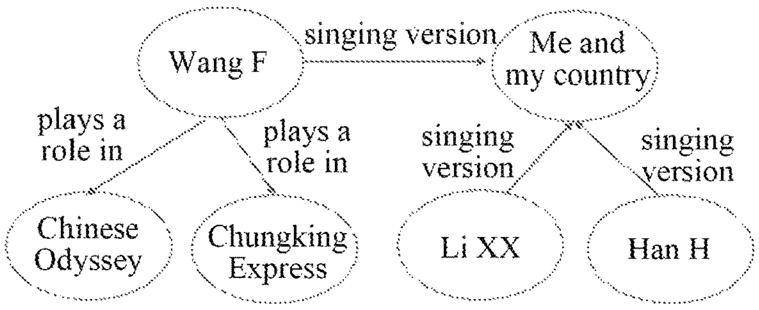
FIG. 3 is a schematic diagram of a knowledge graph of a method for outputting information according to an embodiment of the present disclosure.

In the present embodiment, a Knowledge Graph, referred to in the library and information field as a domain-of-knowledge visualization or domain-of-knowledge mapping map, is a series of different graphs that display the progress of development and structural relationship of knowledge, describes knowledge resources and their carriers by a visualization technique, and excavates, analyzes, constructs, draws, and displays knowledges and their inter-relationships. FIG. 3 shows the peripheral knowledge graph of the entity slots “Wang F”, “Me and My Country”.

In step 206, infer on the basis of the peripheral knowledge graph according to the relationship-determinative word, and output an entity word matching the relationship-determinative word.

In the present embodiment, since the range of the peripheral knowledge graph is relatively large, it needs a relationship-determinative word for further positioning. The relationship-determinative word in FIG. 3 is “version”, and we knows that there could not be a different version for “Wang F”, but there may be different versions for “me and my country,” such as three versions, which are the version sung by Wang F, the version sung by Li XX and the version sung by Han H respectively. By excluding the version sung by “Wang F,” the “singer: Li XX” or “singer: Han H” is returned.

The specific procedure is as follows:

Human: I wanna listen to the song me and my country sung by Wang F.

Robot: the song me and my country sung by Wang F is found for you, please enjoy.

Human: change to another version to listen.

When the user says “change to another version to listen”, the slots “singer: Wang F” “song: me and my country” have been recognized in the preceding round of session, then the current round of session recognizes the slot “play_action: change_version” (change to another version). The present scheme will first retrieve, based on the entity, position and relationship in the knowledge graph thereof: Wang F-singing version-me and my country. Then, in combination with the slot “play_action” (change to another version) of the current round, we can know that there could not be a different version for “Wang F”, but there may be different versions for “me and my country,” such as three versions, which are the version sung by Wang F, the version sung by Li XX and the version sung by Han H respectively. By excluding the version sung by “Wang F,” the “singer: Li XX” or “singer: Han H” is returned.

The method provided in the above-described embodiments of the present disclosure replaces the state machine for maintaining the session process in the conventional solution with a general knowledge graph targeted designed. According to the current solution, only the knowledge graph and the inferring strategy need to be improved, to make the slot recognition in the multi-round session more universal, and the analytic burden of the application party is greatly reduced.

Figure 4:
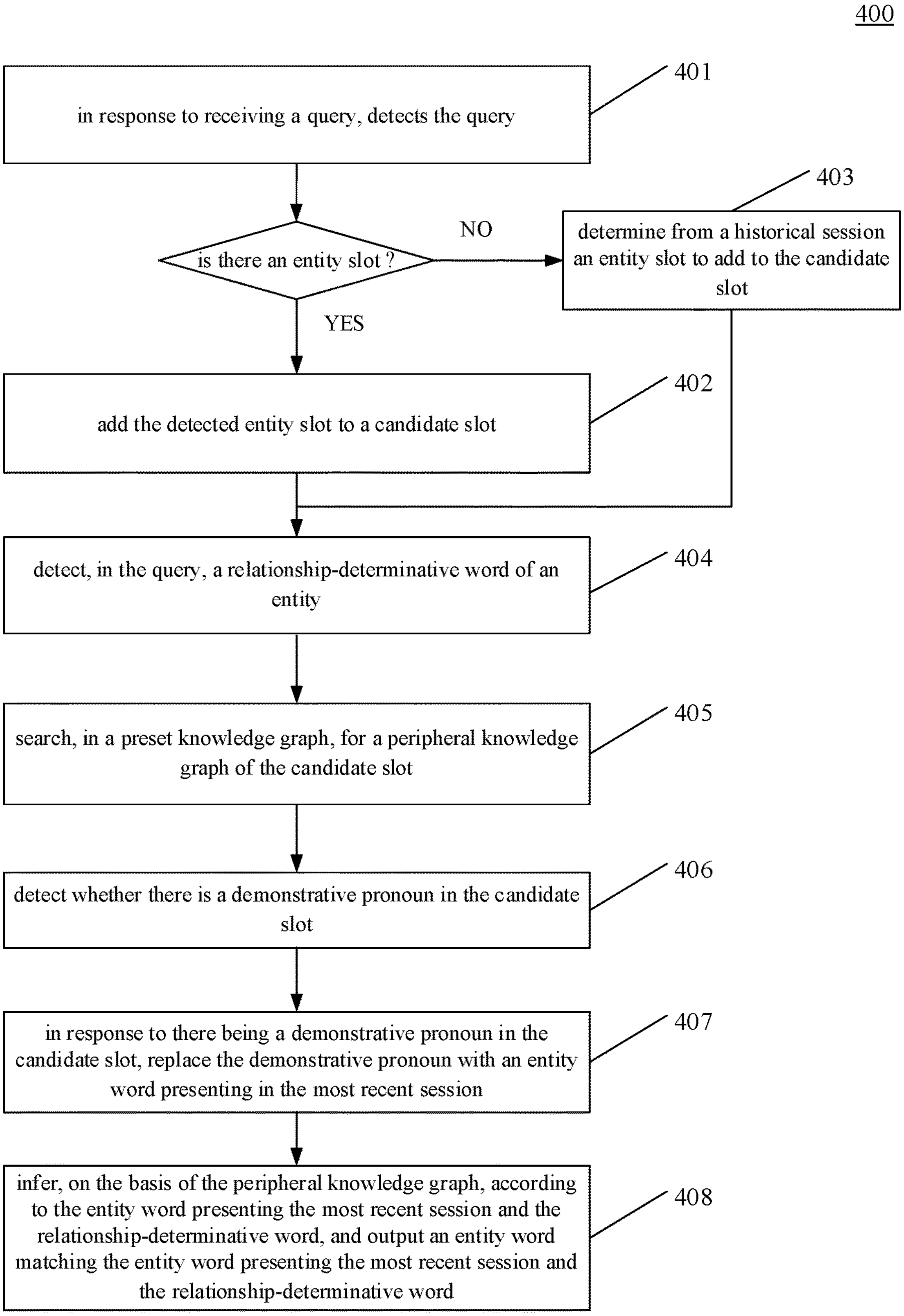
FIG. 4 is a flowchart of a method for outputting information according to another embodiment of the present disclosure.

Further referring to FIG. 4, a flow 400 of a method for outputting information according to another embodiment is illustrated. The flow 400 of the method for outputting information includes the steps of:

In step 401, in response to receiving a query, detects the query.

In step 402, in response to there being an entity slot in the query, add the detected entity slot to a candidate slot.

In step 403, in response to there being not an entity slot in the query, determine from a historical session an entity slot to add to the candidate slot.

Step 404: detect, in the query, a relationship-determinative word of an entity.

In step 405, search, in a preset knowledge graph, for a peripheral knowledge graph of the candidate slot.

Since step 401-405 is substantially the same as step 201-205, details thereof are not described herein.

In step 406, detect whether there is a demonstrative pronoun in the candidate slot.

In the present embodiment, a demonstrative pronoun is a word class for substituting a noun or a sentence. In addition to the words in the grammatical sense, such as us, myself, this, thus, then, them, etc., the demonstrative pronoun may also include words such as just, last, previous, etc. that can find a corresponding entity from a historical session. For example, "change to another version" refers to change "the song me and my country sung by Wang F" to another version.

At step 407, in response to there being a demonstrative pronoun in the candidate slot, replace the demonstrative pronoun with an entity word presenting in the most recent session.

In the present embodiment, in the field of man-machine sessions, the expression of a user is usually not so canonical, in particular in session scenes related to the preceding and following context, the user may omit some words or substitute some of the previously presented word segments with a relationship-determinative word, for example:

Example 1

Human: I wanna listen to the song me and my country sung by Wang F.

Robot: the song me and my country sung by Wang F is found for you, please enjoy.

Human: I wanna watch her movie (slot1: her, slot2: movie).

Example 2

Human: I wanna listen to the song me and my country sung by Wang F.

Robot: the song me and my country sung by Wang F is found for you, please enjoy.

Human: change to another version to listen (slot1: change to another version).

The scheme proposed in the present disclosure may recognize in the third sentence in Example 1 the slots "singer: Wang F" "source_type: movie", and recognize in the third sentence in Example 2 the slots "Wang F" "song: me and my country" "play_action: change_version". The slots recognized by the present scheme is not in the sentence expressed by the user, but are derived by the strategy on the basis of the knowledge graph.

Alternatively, in response to a number of entity words presenting in the most recent session exceeding one, find, according to semantics, an entity word for replacing the demonstrative pronoun, and perform the replacing. For example, a demonstrative pronoun "her" shows up in the third sentence of Example 1, the most recent session is the second sentence where the entity words "Wang F", "Me and my country" present. If the user input is text, it can be determined through "her" that it refers a person, which is used to replace "Wang F". If the user input is speech, it cannot determine whether the reference is a person. But it is known through the relationship-determinative word "sung by" that "her" refers to a person.

At step 408, infer, on the basis of the peripheral knowledge graph, according to the entity word presenting the most recent session and the relationship-determinative word, and output an entity word matching the entity word presenting the most recent session and the relationship-determinative word.

In the present embodiment, as shown in Example 2, when the user says "change to another version to listen", the slots "singer: Wang F" "song: me and my country" have been recognized in the preceding round of session, then the current round of session recognizes the slot "play_action: change_version" (change to another version). The present scheme will first retrieve, based on the entity, position and relationship in the knowledge graph thereof: Wang F-singing version-me and my country. Then, in combination with the slot "play_action" (change to another version) of the current round, we can know that there could not be a different version for "Wang F", but there may be different versions for "me and my country," such as three versions, which are the version sung by Wang F, the version sung by Li XX and the version sung by Han H respectively. By excluding the version sung by "Wang F," the "singer: Li XX" or "singer: Han H" is returned.

As can be seen from FIG. 4, the flow 400 of the method for outputting information in this embodiment embodies the step of replacing the demonstrative pronoun, as compared to the corresponding embodiment of FIG. 2. As a result, the solution described in the present embodiment makes it possible to perform certain anaphora resolution on a demonstrative pronoun, which simplifies the slot naming complexity, and can solve the replacement of a slot, and does not reduce the ability to resolve an action verb or a descriptive or limiting word.

Figure 5:
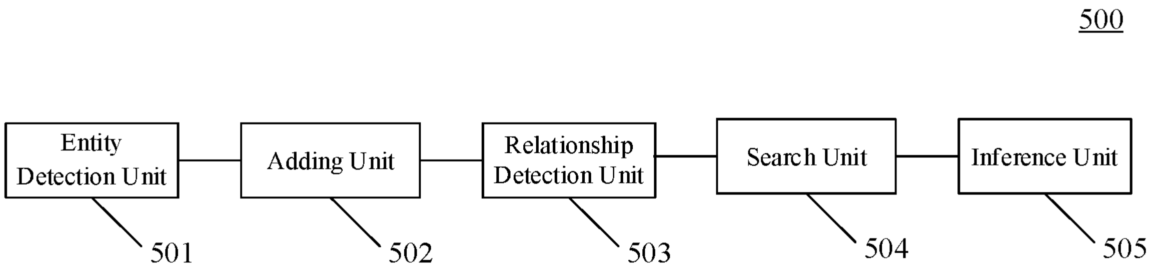
FIG. 5 is a schematic structural diagram of an apparatus for outputting information according to an embodiment of the present disclosure.

With further reference to FIG. 5, as an implementation of the method shown in the above figures, some embodiments of the present disclosure provide an apparatus for outputting information, which corresponds to the method embodiment shown in FIG. 2, and which is particularly applicable to various electronic devices.

As shown in FIG. 5, the apparatus 500 for outputting information in the present embodiment includes an entity detection unit 501, an adding unit 502, a relationship detection unit 503, a search unit 504, and an inference unit 505. The entity detection unit 501 is configured to, in response to receiving a query, detect whether there is an entity slot in the query; the adding unit 502 is configured to, in response to there being an entity slot in the query, add the detected entity slot to a candidate slot; the relationship detection unit 503 is configured to detect, in the query, a relationship-determinative word of an entity; the search unit 504 is configured to search in a preset knowledge graph for a peripheral knowledge graph of the candidate slot; the inference unit 505 is configured to infer on the basis of the peripheral knowledge graph according to the relationship-determinative word, and outputting an entity word matching the relationship-determinative word.

In the present embodiment, specific processing of the entity detection unit 501, the adding unit 502, the relationship detection unit 503, the searching unit 504, and the inference unit 505 of the apparatus 500 for outputting information may refer to step 201-205 in the corresponding embodiment of FIG. 2.

In some alternative implementations of the present embodiment, the adding unit 502 is further configured to: in response to there being not an entity slot in the query, determine from a historical session an entity slot to add to the candidate slot.

In some alternative implementations of the present embodiment, the apparatus 500 further includes a demonstrative pronoun detection unit (not shown in the drawings) configured to: detect whether there is a demonstrative pronoun in the candidate slot; and in response to there being a demonstrative pronoun in the candidate slot, replace the demonstrative pronoun with an entity word presenting in the most recent session.

In some alternative implementations of the present embodiment, the demonstrative pronoun detection unit is further configured to: in response to a number of entity words presenting in the most recent session exceeding one, find, according to semantics, an entity word for replacing the demonstrative pronoun, and perform the replacing.

In some alternative implementations of the present embodiment, the demonstrative pronoun detection unit is further configured to: infer, on the basis of the peripheral knowledge graph, according to the entity word presenting in the most recent session and the relationship-determinative word, and outputting an entity word matching the entity word presenting the most recent session and the relationship-determinative word.

Figure 6:
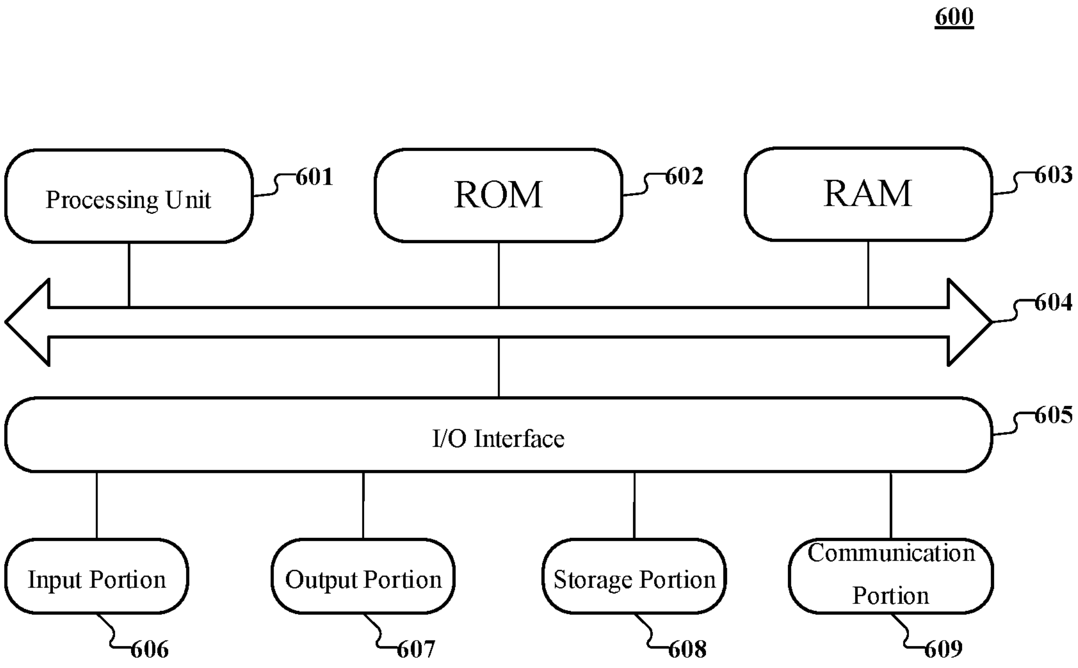
FIG. 6 is a schematic structural diagram of a computer system of an electronic device suitable for implementing embodiments of the present disclosure.

Referring now to FIG. 6, a schematic structural diagram of a computer system 600 (for example, the server or terminal device shown in FIG. 1) adapted to implement an electronic device of the embodiments of the present disclosure is shown. The terminal device in embodiments of the present disclosure may include, but is not limited to, mobile terminals such as a mobile phone, a notebook computer, a digital broadcast receiver, a PDA (Personal Digital Assistant), a PAD (Tablet Computer), a PMP (Portable Multimedia Player), an in-vehicle terminal (e.g., an in-vehicle navigation terminal), and the like, and fixed terminals such as a digital TV, a desktop computer, and the like. The terminal device/server shown in FIG. 6 is merely an example and should not be construed as limiting the functionality and scope of use of the embodiments of the present disclosure.

As shown in FIG. 6, the computer system 600 may include a processing unit 601, such as a central processing unit, image processor, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The processing unit 601, the ROM 602 and the RAM 603 are connected to each other through a bus 604. An input/output (I/O) interface 605 is also connected to the bus 604.

Normally, the following components are connected to the I/O interface 605: an input portion 606 including a touch screen, a touch pad, a keyboard, a mouse, a camera, a microphone, an accelerometer, a gyroscope etc.; an output portion 607 comprising a liquid crystal display device (LCD), a speaker, a vibrator, etc.; a storage portion 608 including a disk, a hard disk and the like; and a communication portion 609. The communication device 609 may allow the electronic device 600 to perform wireless or wired communication with other devices to exchange data. Although FIG. 6 shows an electronic device 600 having various devices, it should be understood that it is not required to implement or have all the devices shown. More or fewer devices may be implemented or provided instead. Each block shown in FIG. 6 may represent one device or multiple devices as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the storage portion 608. The computer program, when executed by the processing unit 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In embodiments of the present disclosure, the computer readable storage medium may be any tangible medium containing or storing programs which can be used by a command execution system, apparatus or element or incorporated thereto. In embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer-readable medium may be included in the electronic device; or may standalone without being assembled into the electronic device. The computer-readable medium carries one or more programs, when the one or more programs are executed by the electronic device, cause the electronic device to: in response to receiving a query, detect whether there is an entity slot in the query; in response to there being an entity slot in the query, add the detected entity slot to a candidate slot; detect, in the query, a relationship-determinative word of an entity; search in a preset knowledge graph for a peripheral knowledge graph of the candidate slot; infer on the basis of the peripheral knowledge graph according to the relationship-determinative word, and outputting an entity word matching the relationship-determinative word.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in embodiments of the present disclosure may be implemented by means of software or hardware. The described units or modules may also be provided in a processor, for example, described as: a processor, comprising an entity detection unit, an adding unit, a relationship detection unit, a search unit and an inference unit, where the names of these units or modules do not in some cases constitute a limitation to such units or modules themselves. For example, the entity detection unit may also be described as "a unit for, in response to receiving a query, detecting whether there is an entity slot in the query."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in embodiments of the present disclosure are examples.

What is claimed is:

1. A method for outputting information, comprising:

in response to receiving a query, detecting whether there is an entity slot in the query;

in response to there being an entity slot in the query, adding the detected entity slot to a candidate slot;

detecting, in the query, a relationship-determinative word of an entity;

searching in a preset knowledge graph for a peripheral knowledge graph of the candidate slot;

inferring on the basis of the peripheral knowledge graph according to the relationship-determinative word;

outputting an entity word matching the relationship-determinative word;

detecting whether there is a demonstrative pronoun in the candidate slot;

in response to there being a demonstrative pronoun in the candidate slot, replacing the demonstrative pronoun with an entity word presenting in the most recent session, wherein the demonstrative pronoun is a word class for substituting a noun or a sentence; and feeding back the entity word to a terminal device.

2. The method according to claim 1, wherein the method further comprises:

in response to there being not an entity slot in the query, determining from a historical session an entity slot to add to the candidate slot.

3. The method according to claim 1, wherein the method further comprises:

determining position and relationship of the entity word presenting in the most recent session in the knowledge graph; and determining a new entity word according to the position, the relationship and the candidate slot.

4. The method according to claim 3, wherein the replacing the demonstrative pronoun with the entity word presenting in the most recent session comprises:

in response to a number of entity words presenting in the most recent session exceeding one, finding, according to semantics, an entity word for replacing the demonstrative pronoun, and performing the replacing.

5. The method according to claim 3, wherein the method further comprises:

inferring, on the basis of the peripheral knowledge graph, according to the entity word presenting the most recent session and the relationship-determinative word, and outputting an entity word matching the entity word presenting the most recent session and the relationship-determinative word.

6. An apparatus for outputting information, comprising:

at least one processor; and a memory storing instructions, the instructions when executed by the at least one processor, cause the at least one processor to perform operations, the operations comprising:

in response to receiving a query, detecting whether there is an entity slot in the query;

in response to there being an entity slot in the query, adding the detected entity slot to a candidate slot;

detecting, in the query, a relationship-determinative word of an entity;

searching in a preset knowledge graph for a peripheral knowledge graph of the candidate slot;

inferring on the basis of the peripheral knowledge graph according to the relationship-determinative word;

outputting an entity word matching the relationship-determinative word;

detecting whether there is a demonstrative pronoun in the candidate slot;

in response to there being a demonstrative pronoun in the candidate slot, replacing the demonstrative pronoun with an entity word presenting in the most recent session, wherein the demonstrative pronoun is a word class for substituting a noun or a sentence; and feeding back the entity word to a terminal device.

7. The apparatus according to claim 6, wherein the operations further comprise:

in response to there being not an entity slot in the query, determining from a historical session an entity slot to add to the candidate slot.

8. The apparatus according to claim 6, wherein the operations further comprise:

determining position and relationship of the entity word presenting in the most recent session in the knowledge graph; and determining a new entity word according to the position, the relationship and the candidate slot.

9. The apparatus according to claim 8, wherein the replacing the demonstrative pronoun with the entity word presenting in the most recent session comprises:

in response to a number of entity words presenting in the most recent session exceeding one, finding, according to semantics, an entity word for replacing the demonstrative pronoun, and performing the replacing.

10. The apparatus according to claim 8, wherein the operations further comprise:

inferring, on the basis of the peripheral knowledge graph, according to the entity word presenting in the most recent session and the relationship-determinative word, and outputting an entity word matching the entity word presenting the most recent session and the relationship-determinative word.

11. A non-transitory computer readable medium having a computer program stored thereon, wherein the program, when executed by a processor, causes the processor to perform operations, the operations comprising:

in response to receiving a query, detecting whether there is an entity slot in the query;

in response to there being an entity slot in the query, adding the detected entity slot to a candidate slot;

detecting, in the query, a relationship-determinative word of an entity;

searching in a preset knowledge graph for a peripheral knowledge graph of the candidate slot;

inferring on the basis of the peripheral knowledge graph according to the relationship-determinative word;

outputting an entity word matching the relationship-determinative word;

detecting whether there is a demonstrative pronoun in the candidate slot;

in response to there being a demonstrative pronoun in the candidate slot, replacing the demonstrative pronoun with an entity word presenting in the most recent session, wherein the demonstrative pronoun is a word class for substituting a noun or a sentence; and feeding back the entity word to a terminal device.

12. The medium according to claim 11, wherein the operations further comprise:

in response to there being not an entity slot in the query, determining from a historical session an entity slot to add to the candidate slot.

13. The medium according to claim 11, where the operations further comprise:

determining position and relationship of the entity word presenting in the most recent session in the knowledge graph; and determining a new entity word according to the position, the relationship and the candidate slot.

14. The medium according to claim 13, wherein the replacing the demonstrative pronoun with the entity word presenting in the most recent session comprises:

in response to a number of entity words presenting in the most recent session exceeding one, finding, according to semantics, an entity word for replacing the demonstrative pronoun, and performing the replacing.

15. The medium according to claim 13, wherein the operations further comprise:

inferring, on the basis of the peripheral knowledge graph, according to the entity word presenting the most recent session and the relationship-determinative word, and outputting an entity word matching the entity word presenting the most recent session and the relationship-determinative word.

* * * * *